Patented July 20, 1954

2,684,391

UNITED STATES PATENT OFFICE 2,684,391

VULCANIZATION OF RUBBER

Frederick Arthur Jones, Birmingham, England, assignor to Dunlop Rubber Company Limited, London County, England, a British company No Drawing. Application April 21, 1951, Serial No. 222,285

Claims priority, application Great Britain May 12, 1950

13 Claims. (Cl. 260—793)

My invention relates to the vulcanisation of rubber, particularly of rubber in the form of latex.

In making rubber articles from latex the latex is compounded with gelling and vulcanising agents, including sulphur and a vulcanisation accelerator, and after shaping the latex mixing, for example by dipping, spreading or extrusion, or by frothing and pouring the froth into moulds, gelling and vulcanisation are effected. Generally ultra-accelerators, e. g. salts of N-substituted dithiocarbamic acids, are used, which makes it possible to effect vulcanisation at a temperature of 100° C. or less and thus to employ steam or hot water as a heating medium.

I have now discovered that the rate of vulcanisation of rubber latex mixings containing dithiocarbamates as accelerators can be increased considerably by incorporating in the mixings a small proportion of an amine.

According to my invention, therefore, a process for the production of rubber articles comprises compounding rubber latex with sulphur, vulcanising accelerator comprising a metal salt of an N-substituted dithiocarbamic acid and a small proportion, based on the dithiocarbamate, of an amine, adding a gelling agent for the latex mixing, shaping and gelling the mixing and then vulcanising the rubber.

The term "amine" is used in the present specification to cover only true amines and not addition products of ammonia such as hexamethylene tetramine, which is not effective as an activator.

The rubber latex mix may be compounded with the amine itself or with a substance which on heating decomposes to give an amine. Vulcanisation in the latter case is effected at a temperature at or above which such decomposition takes place.

Suitable amines are aliphatic amines, e. g. tetraethylene pentamine, triethyltrimethylenetriamine, triethanolamine and diethylamine; aryl-substituted guanidines, e. g. symmetrical diphenylguanidine and symmetrical triphenylguanidine; and alicyclic amines, e. g. dicyclohexylamine and benzylcyclohexylamine. There may also be used a substance which on heating in the presence of eater to a temperature of less than 120° C. decomposes to give an amine, e. g. benzylidine dipiperidine giving piperidine which acts as activator. The amine may be a solid or a liquid and may be added to the mixing in aqueous solution or dispersion, depending on its solubility characteristics. Preferred amounts of the amine are from 2% to 25% by weight of the dithiocarbamate in the accelerator.

It is preferred to use as the vulcanisation accelerator a metal salt of an N-substituted dithiocarbamic acid which is water-insoluble, as no appreciable amount of it is then lost to the aqueous portion of the rubber latex and also as thickening of the latex due to the dithiocarbamate is then minimised or avoided. Examples of such dithiocarbamates are zinc salts of N-substituted dithiocarbamic acid. Although water-insoluble dithiocarbamates are preferred, water-soluble dithiocarbamates may be employed, e. g. alkali metal or ammonium salts of N-substituted dithiocarbamates.

The dithiocarbamate which is particularly suitable is zinc diethyl dithiocarbamate, which may be used either alone or mixed with another accelerator, for example another water-insoluble dithiocarbamate, e. g. with zinc pentamethylene dithiocarbamate, zinc phenylmethyldithiocarbamate or zinc lupetidine dithiocarbamate (also known as zinc lupetidine carbothionolate), or a thiazole, e. g. mercaptobenzthiazole; a mixture of zinc diethyl dithiocarbamate with selenium diethyl dithiocarbamate may also be used. Water-soluble dithiocarbamates which may be used are, for example, sodium pentamethylene dithiocarbamate, sodium dimethyl dithiocarbamate and sodium dibutyl dithiocarbamate.

A compounded rubber latex particularly suitable for use in this invention is one which is compounded with sulphur and zinc oxide to give a soft vulcanised rubber, and containing for every 100 parts by weight of rubber solids 0.3 to 2 parts by weight of an accelerator consisting of or containing a substantial proportion of a dithiocarbamate and an amount of an activator corresponding to 5% to 25% by weight of the dithiocarbamate in the accelerator. Suitable amounts of sulphur and zinc oxide to be compounded with the latex are 1.5 to 3.5 parts by weight and 0.25 to 10 parts by weight respectively for every 100 parts by weight of the rubber solids in the latex. The latex may contain 45% to 70% by weight of rubber solids.

In one method of making rubber sheet according to the invention, a rubber latex is mixed with aqueous dispersions of sulphur and zinc oxide respectively. An aqueous dispersion of a water-insoluble dithiocarbamate accelerator, e. g. zinc diethyl dithiocarbamate, is then added and also a dispersion of an amine, e. g. diphenylguanidine, in water, the amount of the amine corresponding to approximately 10% by weight of the accelerator. This compounded latex is stirred to disperse the solids uniformly and then sodium silicofluoride is added as gelling agent in the form of an aqueous dispersion containing 0.25 to 5 parts by weight of sodium silicofluoride for every 100 parts by weight of rubber in the latex. The compounded latex is poured into a shallow mould while still mobile and allowed to gel and the sheet of gelled compounded rubber is then vulcanised by means of steam or hot water, and then dried.

The following examples are given to illustrate the invention all parts and percentages being by weight:

Example 1

14.4 parts of a dispersion of sulphur containing 25% of sulphur and 14.4 parts of a dispersion of zinc oxide containing 25% of zinc oxide were mixed with 200 parts of a natural rubber latex containing 60% solids by stirring the mixture for 15 minutes at a temperature of approximately 20° C.

The mixing was then divided into two equal parts A and B. To part A 2.4 parts of a 25% dispersion of zinc diethyldithiocarbamate were added and to part B were added 2.16 parts of the dithiocarbamate dispersion and 0.24 part of a 25% dispersion of diphenylguanidine. The mixings were stirred for 15 minutes and from each mix 94 parts were measured and diluted with 6 parts of distilled water. The temperature of the mixings was reduced to 16° C. and 4 parts of a 10% aqueous dispersion of sodium silico-fluoride were added to each mixing. After stirring for 30 seconds the mixings were each poured into a shallow glass mould and set aside for 90 minutes to gel.

The gelled sheets were vulcanised by heating at 100° C. in boiling water for various periods of time and then rapidly cooled by immersion in a large volume of cold water to prevent further vulcanisation; the rubber sheets were then cut into suitable sized pieces for testing and dried at room temperature. The permanent set of the specimens was determined by stretching each for 30 minutes under a load of 1,000 gm., removing the load and allowing the pieces to recover for one hour at 20° C. before measuring the alteration in length. The correct time of vulcanisation was taken as that of the sample showing the minimum permanent set. For mixing A this time was 9 minutes and for mixing B it was 2 minutes, showing that the incorporation of diphenylguanidine in the mixing reduced the vulcanisation time by over 75%.

Example 2

The process of Example 1 was repeated with the difference that only 5.56% of diphenylguanidine, based on the zinc diethyldithiocarbamate, was employed instead of 11.11%. In this case the vulcanisation time with diphenylguanidine was 4 minutes compared with 9 minutes in the case in which it was not employed.

Example 3

Similar processes were carried out as in Example 1 adding to rubber mixings compounded as before a number of other amines and also, for comparative purposes, hexamethylenetetramine; to another rubber mixing, similar in other respects, no amine was added. The mixings contained 0.5% of zinc diethyldithiocarbamate based on the weight of the rubber and 20% of one of the substances listed below based on the weight of the zinc diethyldithiocarbamate. The times required for vulcanising at 100° C. determined as those giving the minimum permanent set are given in the following table.

| Substance added | Time in minutes at 100° C. required for vulcanisation as measured by minimum permanent set |
| --- | --- |
| None | 11 |
| Hexamethylenetetramine | 11 |
| Symmetrical triphenylguanidine | 8 |
| Benzylcyclohexylamine | 8 |
| Triethyltrimethylenetriamine | 4 |
| Diethylamine | 3½ |
| Dicyclohexylamine | 3½ |
| Triethanolamine | 3½ |
| Symmetrical diphenylguanidine | 3 |
| Tetraethylene pentamine | 2½ |
| Benzylidine dipiperidine | 2 |

It will be noted that whereas no improvement was obtained with hexamethylenetetramine, all the other substances produced a marked decrease in vulcanisation time.

Having described my invention, what I claim is:

1. A process for the production of rubber articles comprising compounding rubber latex with sulphur, zinc oxide a vulcanising accelerator comprising a metal salt of an N-substituted dithiocarbamic acid and a proportion less than the dithiocarbamate, of an amine, adding a gelling agent for the latex mixing, shaping and gelling the mixing and then vulcanising the rubber at a temperature not substantially above 100° C.

2. A process according to claim 1 in which the amine is present in an amount of from 2% to 25% by weight of the dithiocarbamate in the accelerator.

3. A process according to claim 2 in which the amine is an aliphatic amine.

4. A process according to claim 2 in which the amine is an aryl substituted guanidine.

5. A process according to claim 4 in which the amine is symmetrical polyphenyl guanidine.

6. A process according to claim 2 in which the amine is an alicyclic amine.

7. A process according to claim 1 in which the dithiocarbamate is water-insoluble.

8. A process according to claim 7 in which the dithiocarbamate is a zinc salt of an N-substituted dithiocarbamic acid.

9. A process according to claim 1 in which the rubber latex is compounded to give a soft vulcanised rubber with sulphur and zinc oxide and for every 100 parts by weight of rubber solids contains 0.3 to 2 parts by weight of accelerator including dithiocarbamate and an amount of an amine equal to 2% to 25% by weight of the dithiocarbamate in the accelerator.

10. A process for the production of rubber articles comprising compounding rubber latex with sulfur, zinc oxide, a zinc salt of an N-substituted dithiocarbamic acid and an amine in a proportion less than that of the dithiocarbamate, adding a gelling agent for the latex mixing, shaping and gelling the mixing and then vulcanizing the rubber at a temperature of approximately 100° C.

11. A process according to claim 3 in which the amine is tetraethylene pentamine.

12. A process according to claim 3 in which the amine is triethanolamine.

13. A process according to claim 3 in which the amine is diethylamine.

References Cited in the file of this patent

UNITED STATES PATENTS

| Number | Name | Date |
|---|---|---|
| 1,778,709 | Caldwell | Oct. 14, 1930 |
| 1,959,160 | Greenup | May 15, 1934 |
| 2,026,442 | Somerville | Dec. 31, 1935 |
| 2,208,327 | Lichty | July 16, 1940 |
| 2,546,083 | Barton | Mar. 20, 1951 |
| 2,549,396 | Somerville | Apr. 17, 1951 |